(12) United States Patent
Xu et al.

(10) Patent No.: US 10,110,458 B2
(45) Date of Patent: Oct. 23, 2018

(54) VM-TO-VM TRAFFIC ESTIMATION IN MULTI-TENANT DATA CENTERS

(71) Applicant: NEC Laboratories America, Inc., Princeton, NJ (US)

(72) Inventors: Qiang Xu, Plainsboro, NJ (US); Cristian Lumezanu, Princeton Junction, NJ (US); Cheng Jin, Minneapolis, MN (US); Hyun-Wook Baek, Salt Lake City, UT (US); Guofei Jiang, Princeton, NJ (US)

(73) Assignee: NEC Corporation (JP)

( * ) Notice: Subject to any disclaimer, the term of this patent is extended or adjusted under 35 U.S.C. 154(b) by 64 days.

(21) Appl. No.: 15/264,706

(22) Filed: Sep. 14, 2016

(65) Prior Publication Data
US 2017/0118100 A1    Apr. 27, 2017

Related U.S. Application Data

(60) Provisional application No. 62/246,867, filed on Oct. 27, 2015.

(51) Int. Cl.
*H04L 12/26* (2006.01)
*H04L 12/707* (2013.01)
*H04L 12/741* (2013.01)
*H04L 12/721* (2013.01)
*H04L 12/815* (2013.01)
*H04L 12/24* (2006.01)

(52) U.S. Cl.
CPC ...... *H04L 43/0882* (2013.01); *H04L 41/0823* (2013.01); *H04L 41/14* (2013.01); *H04L 43/0823* (2013.01); *H04L 45/22* (2013.01); *H04L 45/54* (2013.01); *H04L 45/70* (2013.01); *H04L 47/22* (2013.01)

(58) Field of Classification Search
CPC . H04L 43/0882; H04L 43/0823; H04L 45/22; H04L 45/54; H04L 45/70; H04L 47/22
See application file for complete search history.

(56) References Cited

U.S. PATENT DOCUMENTS

| 8,028,337 | B1 * | 9/2011 | Xu | G06F 11/00 370/342 |
| 2005/0010571 | A1 * | 1/2005 | Solotorevsky | G06Q 10/10 |
| 2008/0145047 | A1 * | 6/2008 | De Vega Rodrigo | H04L 45/123 398/25 |
| 2011/0047610 | A1 * | 2/2011 | Mylavarapu | H04L 63/0428 726/12 |

OTHER PUBLICATIONS

Hoskuldsson, Path Regression models and process optimisation, 1987, 235-248.*

(Continued)

*Primary Examiner* — Ronald B Abelson
(74) *Attorney, Agent, or Firm* — Joseph Kolodka (57) ABSTRACT

Methods and systems for network management include performing path regression to determine an end-to-end path across physical links for each data flow in a network. A per-flow utilization of each physical link in the network is estimated based on the determined end-to-end paths. A management action is performed in the network based on the estimated per-flow utilization.

14 Claims, 4 Drawing Sheets

(56) References Cited

OTHER PUBLICATIONS

Kuai Xu et al., Profiling-as-a-Service in Multi-Tenant Cloud Computing Environments, 2012 32nd International Conference on Distributed Computing Systems Workshops, Jun. 2012.
Theophilus Benson et al., Network Traffic Characteristics of Data Centers in the Wild, IMC'10, Nov. 1-3, 2010, Melbourne, Australia.
Srikantha Kandula et al., The Nature of Datacenter Traffic: Measurements & Analysis, IMC'09, Nov. 4-6, 2009, Chicago, Illinois.
Theophilus Benson et al., Understanding Data Center Traffic Characteristics, ACM SIGCOMM Computer Communication Review, vol. 40, No. 1, Jan. 2010.
Chuanxiong Guo et al., Pingmesh: A Large-Scale System for Data Center Network Latency Measurement and Analysis, SIGCOMM '15, Aug. 17-21, 2015, London, United Kingdom.
Yin Zhang et al., Fast Accurate Computation of Large-Scale IP Traffic Matrices from Link Loads, SIGMETRICS'03, Jun. 10-14, 2003, San Diego, California.

\* cited by examiner

VM-TO-VM TRAFFIC ESTIMATION IN MULTI-TENANT DATA CENTERS

RELATED APPLICATION INFORMATION

This application claims priority to U.S. Provisional Application No. 62/246,867 filed on Oct. 27, 2015, incorporated herein by reference in its entirety.

BACKGROUND

Technical Field

The present invention relates to data center management and, more particularly, to estimating traffic along virtual flows in a multi-tenant data center.

Description of the Related Art

Modern data centers may serve multiple clients with a single device using, for example, virtual machines to host the multiple workloads as if they were on separate hardware. In addition, software defined networking provides network administrators with the ability to dynamically reorganize network resources, creating and reorganizing virtual local area networks (VLANs) and virtual extensible local area networks (VXLANs) on the fly.

However, when multiple different workflows may be transmitted along a single shared physical link, it can be difficult to obtain flow-level information. In a multi-tenant data center, where a single device with a single physical link can host multiple virtual machines and multiple virtual links, it is difficult to break down the utilization of that physical link into the usage of the multiple virtual links.

Existing attempts to find flow-level information focus on three points: improving the collection of performance counters from distributed network devices (e.g., switches and middleboxes) in data centers, scalable data collection systems, and instrumenting virtualization platforms. For example, some solutions make use of additional instrumentation at the hypervisor level to perform packet-level inspection. Such inspection offers accuracy in determining information about the flows on a link, but generally involves significant increases in the cost and complexity of network monitoring.

SUMMARY

A method for network management include performing path regression to determine an end-to-end path across physical links for each data flow in a network. A per-flow utilization of each physical link in the network is estimated based on the determined end-to-end paths. A management action is performed in the network based on the estimated per-flow utilization.

A method for network management includes performing path regression to determine an end-to-end path across physical links for each data flow in a network by determining a portion of an end-to-end path based on forwarding table information and determining a remainder of the end-to-end path based on one or more inference rules. A number of flows is reduced by filtering the flows according to one or more rules and clustering the filtered flows into flow groups. Per-flow utilization of each physical link in the network is estimated based on the determined end-to-end paths. A management action is performed in the network based on the estimated per-flow utilization.

A system for network management includes a path regression module having a processor configured to determine an end-to-end path across physical links for each data flow in a network. A flow utilization estimation module is configured to estimate per-flow utilization of each physical link in the network based on the determined end-to-end paths. A network management module is configured to perform a management action in the network based on the estimated per-flow utilization.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present principles provide flow-level traffic analysis in multi-tenant data centers based on existing performance counters and readily available network forwarding table information. The present embodiments employ path regression to recreate a flow map when forwarding table information has expired. Filtering and clustering of flows is used to reduce the number of variables in play, making a matrix representation of which flows are active on which links. The reconstructed flow information is then used to generate a set of expected link performance measurements which can be compared to actual link performance measurements to determine a degree of error in the flow traffic output.

Figure 1:
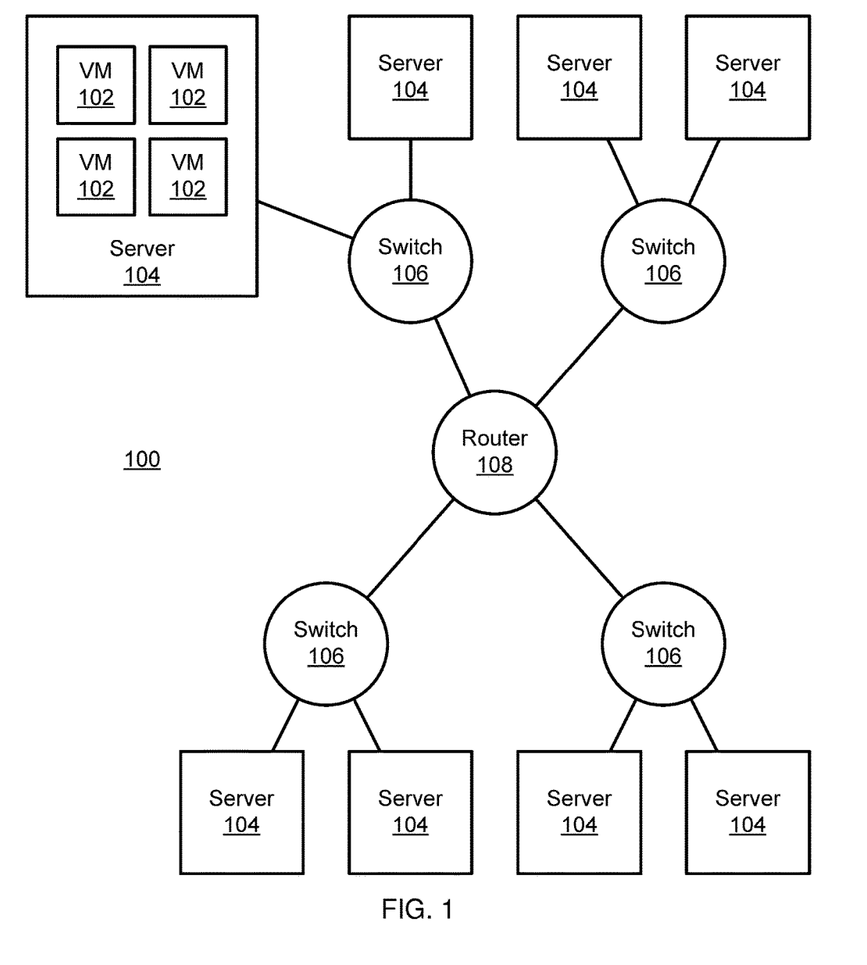
FIG. 1 is a block diagram of a multi-tenant data center network in accordance with the present principles.

Referring now to FIG. 1, a generalized diagram of a data center network 100 is shown. Multiple virtual machines (VMs) 102 may be implemented on a single physical server 104. The server 104 has a link to a switch 106 which may be connected to other servers 104, other switches 106, and a router 108. This represents the physical network with physical links, but the communications may additionally have a logical layer on top of the physical network layer that forms virtual networks (e.g., virtual local area networks (VLANs) and virtual extensible local area networks (VXLANs)).

From the perspective of a single VM 102 in the data center network 100, other VMs 102 may appear to be local or may be in separate virtual network segments, with communication mediated by VLAN or VXLAN gateways (which may be implemented as distinct servers 102 within the network and which need not be situated within the most direct physical routing path between two VMs 102). As such, the path a given flow takes through the physical network 100 can be non-trivial, with traffic from a given VM 102 visiting multiple locations before reaching its destination.

These arrangements are particularly useful for cloud computing environments, where many clients may be served by a single server 104. The virtualization described above allows VMs 102 to act in a simple, easy-to-provision manner without any awareness of the actual network structure. However, when multiple flows exist on a single physical link (and indeed, when those flows sometimes double back on a given link), it is challenging to identify, for example, what flows are the cause of a local network hotspot.

The devices in the network 100 can maintain certain information regarding the network's traffic. For example, the simple network management protocol (SNMP) may be implemented in switches 106 and routers 108 to track, for example, forwarding tables, performance counters for physical links, VLAN and VXLAN configurations, etc. Additionally, edge devices may keep information such as VM locations (i.e., the physical server 104 on which a given VM 102 resides), VLAN and VXLAN allocations to clients, etc. It should be noted that this information is collected as a matter of standard practice and that no additional instrumentation need be introduced to determine these points.

Some of the information, however, may be unreliable. For example, in the case of forwarding tables, the tables may suffer from the expiration of entries. As a result, this information provides only partial visibility for a given source/destination pair.

Figure 2:
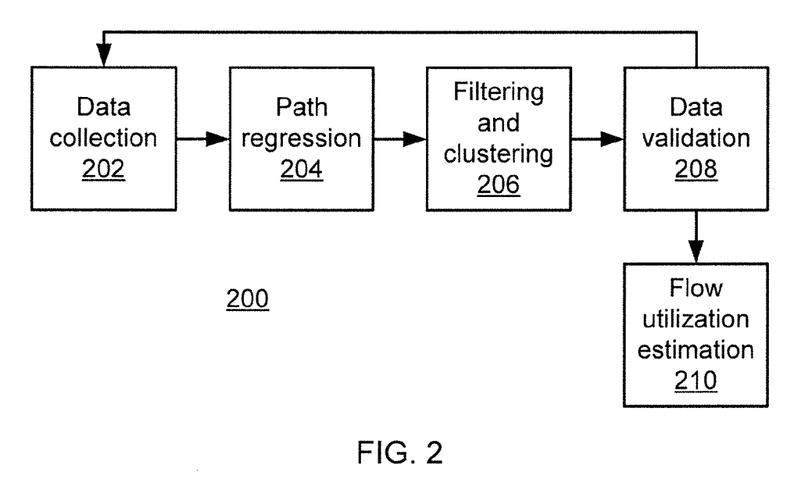
FIG. 2 is a block/flow diagram of a method/system for estimating flow utilization in accordance with the present principles.

Referring now to FIG. 2, a system 200 for flow-level traffic analysis is shown. Block 202 collects data within a network 100. As noted above, a significant amount of data may be tracked as a matter of standard operation within the data center network 100, and this information may be made available in block 202. It should be noted that this data collection may be performed with zero instrumentation or any other kind of alteration to the existing data collection mechanisms within a data structure. While the log format may vary from one virtualization platform to the next, the availability of the data is generally present.

As noted above, some of the data from the forwarding tables may be incomplete. Block 204 uses the available data to perform path regression to determine the end-to-end paths of VM pairwise flows. Domain knowledge may be employed to help construct a coarse-grained path. For example, it may be known that the end-to-end path includes intermediate hops such as host servers 104, VXLAN gateways, and switches 106. The forwarding tables collected by block 202 are used to determine the exact intermediate hops—e.g., which VXLAN in particular serves the communication, followed by filling in the hops between known intermediate hops. After all hops in a flow path are filled in, a complete end-to-end path for the given source and destination pair is computed. Thus path regression block 204 generates a many-to-many mapping from flows to physical links (e.g., switch ports, service ports, VM ports, etc.) that may be represented in the form of a matrix.

To address the problem of forwarding table expiration, rules may be used to infer forwarding behavior. One such rule notes that MAC addresses in a same VLAN are likely to share a same path. In addition, forwarding possibilities are narrowed based on network graph properties and the search space for forwarding is reduced based on the network configuration. Another rule is that, if a particular MAC address fails to appear in a large number of forwarding table snapshots, it implies that the flows originating from that MAC address are negligible.

In addition to the particular difficulty of accessing complete forwarding table information, performance counters acquired by data collection block 202 may be introduced with noise, time misalignments, conflicts, etc. These cause inaccuracies in the flow traffic analysis but, as described below, feedback based on an error analysis is generated to compensate for the inaccuracies.

For each physical link, which may include switch ports, server ports, middlebox ports, etc., the total utilization of flows carried by the link can be expressed as an equation to express the performance counter of that interface. It should be recognized that this representation is likely to include some inaccuracies if some forwarding table information was unavailable. The flows can be represented as a matrix as shown in Table 1 below:

TABLE 1

|  | Flow 1 | Flow 2 | Flow 3 | . . . | Flow N |
|---|---|---|---|---|---|
| Link 1 | 0 | 0 | 0 | . . . | 0 |
| Link 2 | 1 | 0 | 1 | . . . | 1 |
| Link 3 | 0 | 1 | 0 | . . . | 1 |
| . . . | . . . | . . . | . . . | . . . | . . . |
| Link M | 0 | 1 | 1 | . . . | 1 |

In this representation, each row may be considered an equation, with the values in each column representing values for the variables of the equation. Looking at the rows another way, each row identifies which flows are traveling on the respective link. The columns, meanwhile, represent the links that a given flow traverses. However, this system will be difficult to solve in this form, because the number of variables dwarfs the number of equations. As such, block 206 performs filtering and clustering to reduce the number of variables by eliminating flows that are unlikely to be active. Exemplary filters that may be used include:

1. Link counter based filters—if the traffic counter of a link is below a threshold, all the virtual links traversing through the link can be expected to be inactive;

2. Temporal domain-based filters—if the history of a flow follows certain inactive patterns, the flow can be expected to be inactive in the short term; and 3. Spatial domain-based filters—some flows' activity may be dependent on other flows and thus, if certain flows are known to be inactive, the other flows depending on them will also be inactive.

It should be recognized that these filters are included for the purpose of description only and should not be construed as limiting. After filtering, the number of flows being considered should approximately match the number of links in the data center network 100 to make the system of equations solvable. If filtering does not reduce the number of flows sufficiently, the remaining flows may be clustered to further reduce their effective number. Clustering may be performed if, for example, two flows have the same vertical vector in the flow matrix.

The solution of the system of equations can be expressed as P×F=L, where P is the matrix as described above, F is a column vector of flow performance, and L is a column vector of respective link counters collected from block 202 using, e.g., SNMP data. The flow performance is unknown, but the inferred P matrix and the known L vector permit the calculation of an inferred flow performance vector F'. One exemplary measurement of flow performance may be the size of a flow in terms of a number of bytes.

Block 208 can then provide data verification based on the inferred flow performance vector F'. The P matrix and the F' vector are used to calculate an expected link counter vector L'. The difference between the expected L' and the known L reflects the quality of the data set. If the performance counters are significantly affected by, e.g., noise or time alignment issues, the error vector L'-L will be significant. A classification of errors is possible as follows:

1. If errors have locality behavior (i.e., if physical lengths close to one another have high errors), there may be some data collection misconfiguration;
2. If the error is close to the averaged error, then the link does not significantly affect data quality; and
3. If the error of a link shows some up-and-down behavior over time, it is likely due to a time alignment issue.

Depending on the error type, data validation block 208 feeds information back to data collection block 202 to improve future data collection.

After the matrix P and inferred flow performance vector F' have been calculated, block 210 uses this information to estimate flow utilization.

Figure 3:
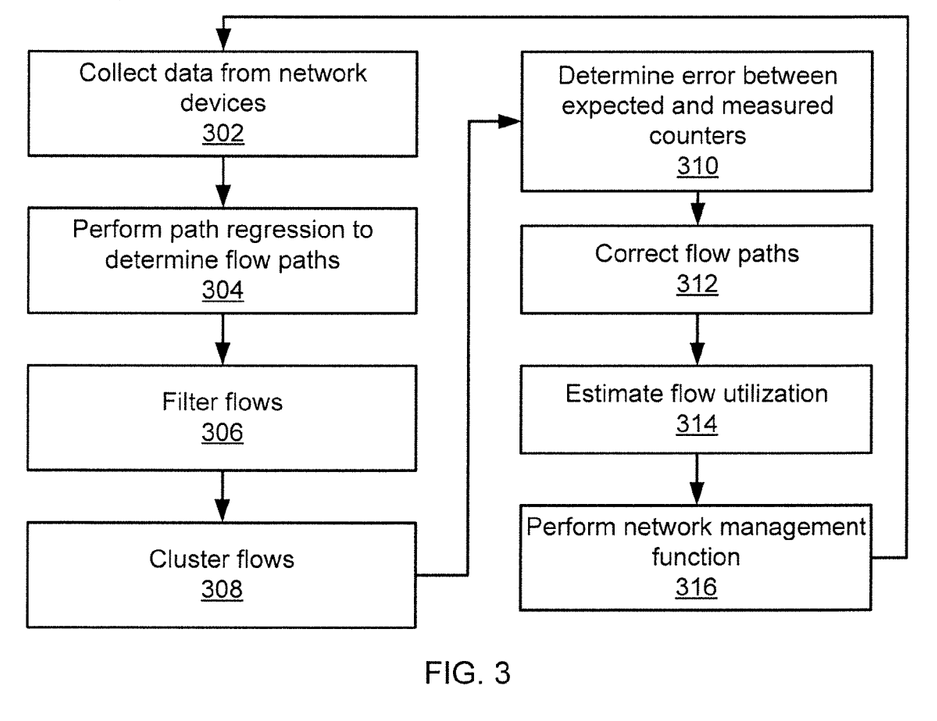
FIG. 3 is a block/flow diagram of a method for estimating flow utilization in accordance with the present principles.

Referring now to FIG. 3, a method for flow-level traffic analysis is shown. Block 302 collects data from network devices (e.g., servers 104, switches 106, and routers 108) relating to link and flow performance. This information can be collected using existing SNMP and software defined networking protocols without introducing any new instrumentation in the network device. Block 304 performs path regression based on the collected information to determine an end-to-end path through the network 100 for each flow. As discussed above, the information collected by block 302 may not be sufficient to completely determine complete paths for every flow. As such, block 302 may perform inferences based on rules and other information to fill any gaps in the flow paths.

Because the number of flows may be much greater than the number of physical links in the network 100, block 306 may filter the flows based on criteria such as those discussed above or any other appropriate rules determined by statistics or domain knowledge. In particular, block 306 filters out flows that can be predicted to have very little activity. If the filtering of block 306 is insufficient to reduce the number of flows being considered to or below the number of physical links, block 308 performs clustering to group flows together to further reduce the number of flow groups being considered.

Block 310 uses the measured link counters from block 302 and the end-to-end flow paths from block 304 to generate an inferred flow performance vector F' as described above. The inferred flow performance vector F' is then used with the flow path matrix P to generate an expected link counter vector L', which block 310 compares to the measured link counter information to determine an error vector. Based on the error vector, block 312 adjusts the flow path matrix P to account for the errors.

Block 314 estimates the flow utilization using the inferred flow performance vector F'. This information reflects which flows use each physical link in the network 100 and their respective contributions to the traffic on those links. Based on the flow utilization estimate, block 316 performs a network management function. For example, in the case of high utilization on a particular link that causes a bottleneck, block 316 may trigger rerouting one or more flows from the overloaded physical link to another path in the network 100. Other network management actions may include prioritizing traffic from particular flows, restricting bandwidth available to particular flows, changing the network topology, changing settings at servers 104, switches 106, or routers 108, or any other network management action within the ability of those having ordinary skill in the art.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 4:
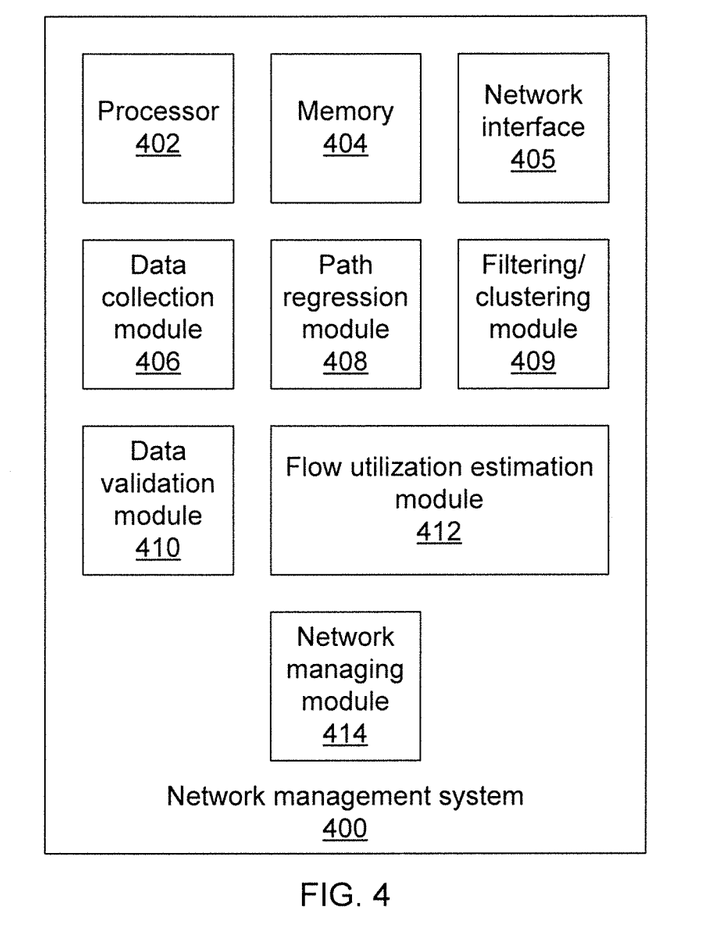
FIG. 4 is a block diagram of a system for estimating flow utilization in accordance with the present principles.

Referring now to FIG. 4, a network management system 400 is shown. The system 400 includes a hardware processor 402 and a memory 404. The system 400 may further include one or more physical network interfaces 405 that the system 400 uses to communicate with other devices on a network 100. The system also includes one or more functional modules. In one embodiment, the functional modules may be implemented as software that is stored in memory 404 and is executed by processor 402. In an alternative embodiment, some or all of the functional modules may be implemented as one or more discrete hardware components in the form of, e.g., application specific integrated chips or field programmable gate arrays.

A data collection module 406 accesses the other devices on the network 100 to acquire available information regarding the devices and physical links in the network 100. A path regression module 408 performs path regression using the collected data to fill out end-to-end paths for each flow and data validation module 410 performs data validation to make corrections to the path regression. Flow utilization estimation module 412 determines how the various flows use the physical links in the network 100. If there are too many flows to perform the flow utilization estimation, filtering/clustering module 409 filters out and clusters flows as needed to reduce that number. Network managing module 414 uses the flow utilization estimates to perform network management operations within the network 100 to improve the performance of the network.

Figure 5:
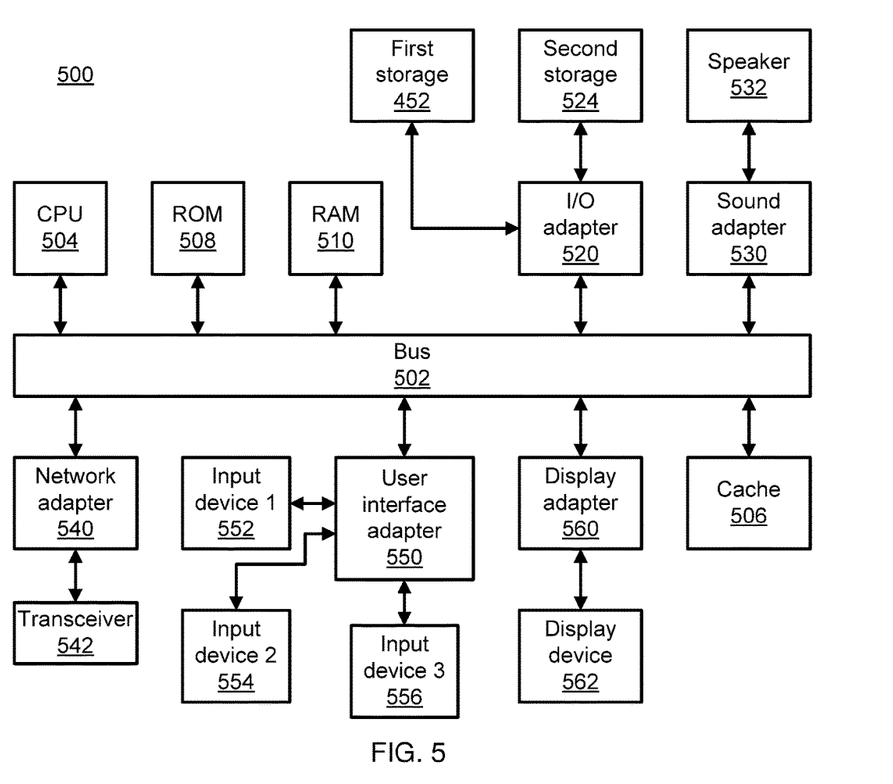
FIG. 5 is a block diagram of a processing system in accordance with the present principles.

Referring now to FIG. 5, an exemplary processing system 500 is shown which may represent the network management system 400. The processing system 500 includes at least one processor (CPU) 504 operatively coupled to other components via a system bus 502. A cache 506, a Read Only Memory (ROM) 508, a Random Access Memory (RAM) 510, an input/output (I/O) adapter 520, a sound adapter 530, a network adapter 540, a user interface adapter 550, and a display adapter 560, are operatively coupled to the system bus 502.

A first storage device 522 and a second storage device 524 are operatively coupled to system bus 502 by the I/O adapter 520. The storage devices 522 and 524 can be any of a disk storage device (e.g., a magnetic or optical disk storage device), a solid state magnetic device, and so forth. The storage devices 522 and 524 can be the same type of storage device or different types of storage devices.

A speaker 532 is operatively coupled to system bus 502 by the sound adapter 530. A transceiver 542 is operatively coupled to system bus 502 by network adapter 540. A display device 562 is operatively coupled to system bus 502 by display adapter 560.

A first user input device 552, a second user input device 554, and a third user input device 556 are operatively coupled to system bus 502 by user interface adapter 550. The user input devices 552, 554, and 556 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 552, 554, and 556 can be the same type of user input device or different types of user input devices. The user input devices 552, 554, and 556 are used to input and output information to and from system 500.

Of course, the processing system 500 may also include other elements (not shown), as readily contemplated by one of skill in the art, as well as omit certain elements. For example, various other input devices and/or output devices can be included in processing system 500, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 500 are readily contemplated by one of ordinary skill in the art given the teachings of the present principles provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for network management, comprising:
   performing path regression to determine an end-to-end path across physical links for each data flow in a network;
   reducing a number of flows by filtering the flows according to one or more rules;
   estimating per-flow utilization of each physical link in the network based on the determined end-to-end paths; and
   performing a management action in the network based on the estimated per-flow utilization,
      wherein performing path regression comprises determining a portion of an end-to-end path based on forwarding table information and determining a remainder of the end-to-end path based on one or more inference rules.

2. The method of claim 1, further comprising:
   calculating expected link counts based on the determined end-to-end paths;
   comparing the expected link counts to measured link counts to generate an error measurement; and
   adjusting the determined end-to-end paths based on the error measurement.

3. The method of claim 2, wherein calculating the expected link counts comprises:
   representing the end-to-end paths as a path matrix;
   representing the measured link counts as a measured link count vector;
   determining an inferred flow performance vector based on the path matrix and the measured link count vector; and
   determining an expected link count vector based on the path matrix and the inferred flow performance vector.

4. The method of claim 1, further comprising clustering the flows into flow groups.

5. The method of claim 1, wherein performing the network management function comprises one or more of rerouting a flow, changing a topology of the network, and changing a setting of a device on the network.

6. A method for network management, comprising:
   performing path regression to determine an end-to-end path across physical links for each data flow in a network;
   reducing a number of flows by filtering the flows according to one or more rules and clustering the filtered flows into flow groups;
   estimating per-flow utilization of each physical link in the network based on the determined end-to-end paths; and
   performing a management action in the network based on the estimated per-flow utilization,
      wherein performing path regression comprises determining a portion of an end-to-end path based on forwarding table information and determining a remainder of the end-to-end path based on one or more inference rules.

7. The method of claim 6, further comprising:
   calculating expected link counts based on the determined end-to-end paths;
   comparing the expected link counts to measured link counts to generate an error measurement; and adjusting the determined end-to-end paths based on the error measurement.

8. The method of claim 7, wherein calculating the expected link counts comprises:
representing the end-to-end paths as a path matrix;
representing the measured link counts as a measured link count vector;
determining an inferred flow performance vector based on the path matrix and the measured link count vector; and
determining an expected link count vector based on the path matrix and the inferred flow performance vector.

9. The method of claim 6, wherein performing the network management function comprises one or more of rerouting a flow, changing a topology of the network, and changing a setting of a device on the network.

10. A system for network management, comprising:
a path regression module comprising a processor configured to determine an end-to-end path across physical links for each data flow in a network;
a filtering module configured to reduce a number of flows by filtering the flows according to one or more rules;
a flow utilization estimation module configured to estimate per-flow utilization of each physical link in the network based on the determined end-to-end paths; and
a network management module configured to perform a management action in the network based on the estimated per-flow utilization,
wherein the path regression module is further configured to determine a portion of an end-to-end path based on forwarding table information and to determine a remainder of the end-to-end path based on one or more inference rules.

11. The system of claim 10, further comprising a data validation module configured to calculate expected link counts based on the determined end-to-end paths, to compare the expected link counts to measured link counts to generate an error measurement, and to adjust the determined end-to-end paths based on the error measurement.

12. The system of claim 11, wherein the data validation module is further configured to represent the end-to-end paths as a path matrix, to represent the measured link counts as a measured link count vector, to determine an inferred flow performance vector based on the path matrix and the measured link count vector, and to determine an expected link count vector based on the path matrix and the inferred flow performance vector.

13. The system of claim 10, further comprising a clustering module configured to cluster the flows into flow groups.

14. The system of claim 10, wherein the network management function comprises one or more of rerouting a flow, changing a topology of the network, and changing a setting of a device on the network.

* * * * *